United States Patent [19]
Cotter et al.

[11] 3,947,121
[45] Mar. 30, 1976

[54] METHOD FOR ALIGNING MICROSTRUCTURES

[75] Inventors: Douglas A. Cotter; Charles H. Rogers, both of Raleigh, N.C.

[73] Assignee: Corning Glass Works, Corning, N.Y.

[22] Filed: July 30, 1973

[21] Appl. No.: 383,832

[52] U.S. Cl. ................... 356/38; 350/95; 356/244
[51] Int. Cl.² .................................... G02B 21/34
[58] Field of Search ............... 350/92, 94, 95, 147; 356/36, 38, 39, 40, 42, 244, 246, 210

[56] References Cited
UNITED STATES PATENTS

| | | | |
|---|---|---|---|
| 1,878,847 | 9/1932 | Hausser et al. | 356/42 |
| 1,940,373 | 12/1933 | Schoenberg | 350/95 X |
| 2,281,100 | 4/1942 | Land | 350/147 UX |
| 3,043,183 | 7/1962 | Weller | 356/210 X |
| 3,359,055 | 12/1967 | Krause | 350/92 |
| 3,672,745 | 6/1972 | Speelman | 350/92 |

OTHER PUBLICATIONS
Miller et al.; I.B.M. Technical Disclosure Bulletin, Vol. 12, No. 2, July 1969, p. 328.

*Primary Examiner*—Alfred E. Smith
*Assistant Examiner*—F. L. Evans
*Attorney, Agent, or Firm*—Walter S. Zebrowski; Clarence R. Patty, Jr.

[57] ABSTRACT

A device embodying a substrate having at least one longitudinal groove formed in a flat surface thereof for accommodating microstructures for microscopic examination.

2 Claims, 1 Drawing Figure

U.S. Patent   March 30, 1976   3,947,121
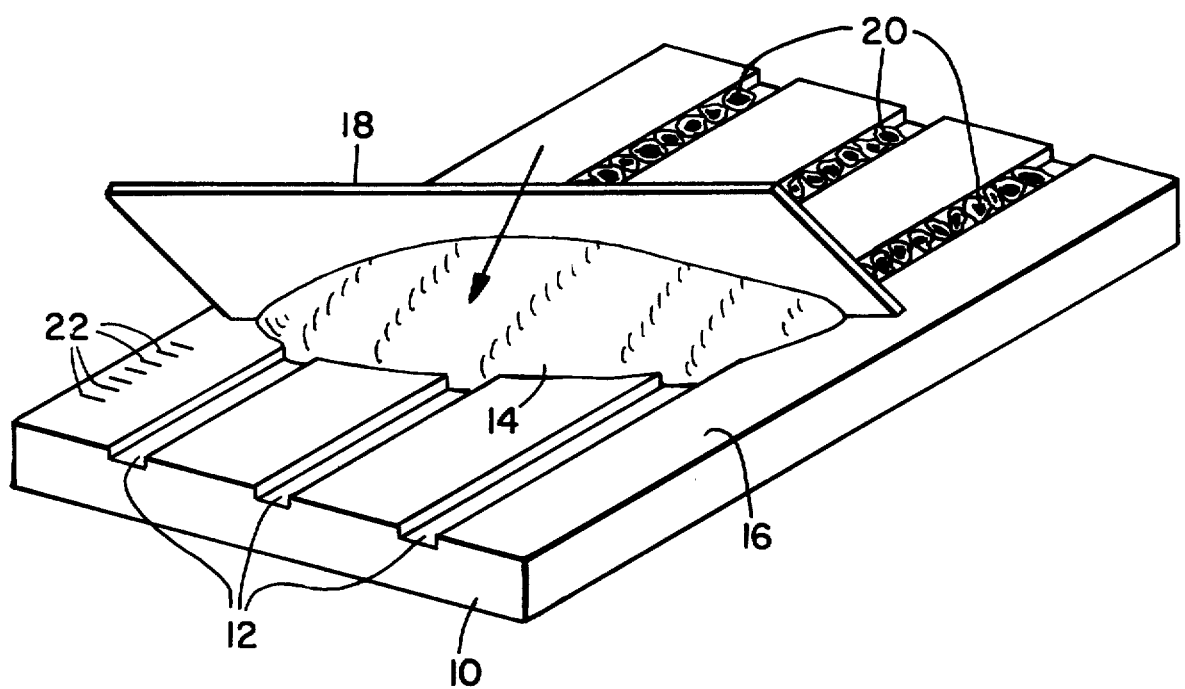

METHOD FOR ALIGNING MICROSTRUCTURES

BACKGROUND OF THE INVENTION

Heretofore, microstructures, such for example as leukocytes, were prepared for microscopic examination by the wedge and cover-slide method or by a centrifuge whereby a blood smeared slide was prepared. On such microscopic slides, the leukocytes were randomly distributed and the observer had to search them out for examination and counting. Due to the random arrangement of the leukocytes on a blood smeared slide much time would be required by the operator to find each of the leukocytes before they could be examined and counted.

SUMMARY OF THE INVENTION

It is the object of this invention to provide a simple, economical, and reliable device for aligning microstructures for microscopic examination, which device overcomes the heretofore noted disadvantages.

Broadly, according to this invention, a device for aligning microstructures for microscopic examination embodies a substrate having at least one flat surface and at least one longitudinal groove formed in the flat surface for accommodating the microstructures. For ease of making a microscopic examination of such microstructures, a means for maintaining the microstructures in focus during such examination may be provided.

Additional objects, features, and advantages of the present invention will become apparent to those skilled in the art from the following detailed description and the attached drawing on which, by way of example, only the preferred embodiment of the present invention is illustrated.

BRIEF DESCRIPTION OF THE DRAWING

The single FIGURE shows an oblique view illustrating the device of the present invention.

DETAILED DESCRIPTION OF THE INVENTION

It is to be noted that the single FIGURE of the drawing is illustrative and symbolic of the invention, and there is no intention to indicate scale or relative proportions of the elements shown therein. For the purpose of simplicity, the present invention will be described in connection with a device for aligning leukocytes for microscopic examination, however, the present invention is in no way limited for use in connection with blood examinations, rather is applicable to aligning any microstructures in a liquid for microscopic examination.

Referring to the single FIGURE of the drawing, there is shown a substrate 10 within which a plurality of straight, longitudinal channels 12 have been formed in one of the flat surfaces of substrate 10.

Substrate 10 may be an ordinary glass microscope slide within which channels 12 have been formed. Channels 12 may be formed by any means known in the art. One example is taught in U. S. Pat. No. 2,628,160 by S. D. Stookey, which patent is herein incorporated by reference. This patent teaches chemical machining or sculpturing of glass.

In the example wherein the microstructures to be examined are leukocytes, a quantity of blood is first prepared by lysing the erythrocytes of the whole blood. This is accomplished by mixing the whole blood with a 2 percent aqueous solution of acetic acid. For suitable lysing, about one part of acetic acid is mixed with 10 parts whole blood. When the erythrocytes are lysed, the only microscopic structures remaining in the liquid are the leukocytes. A quantity 14 of this liquid is then placed upon the channeled flat surface 16 of substrate 10 and member 18 is pulled or pushed across the flat surface 16 in a squeegee-like manner. The leukocyte containing liquid is pulled across surface 16 of substrate 10 ahead of member 18. With the leukocytes being the only microstructures remaining, the red blood cells having been lysed, the leukocytes 20 will drop into channels 12 much like B-B's in an oil. Member 18 may be an ordinary microscope slide or the like. After the leukocyte containing liquid is pulled across surface 16 only the leukocytes structures will drop in channels 12 while the bulk of the remaining portion of the liquid is pushed off the edge of member 10.

When the microstructures are leukocytes, they may thereafter be dried, dyed, and otherwise treated as is ordinarily required for the examination of bloood smears. Substrate 10 may then be placed in a microscope and the microscope objective may be aligned with one of the channels 12 and examined as heretofore except that all of the leukocytes are now aligned within the channels rather than be disposed over the surface of a microscope slide in a random manner.

To facilitate maintaining the micrsotructures in focus, as for example in automatic blood slide scanners, the focusing system described in U.S. patent application Ser. No. 399,619, filed Sept. 21, 1973 entitled "Automatic Focusing System" by L. G. Amos, J. S. Boone, D. L. Hollis, C. H. Rogers, and B. H. Sage, and now abandoned, or the like may be used. This application is incorporated herein by reference. Another means for maintaining the microstructures in focus, may be the formation of a plurality of graticles 22 on one of the surfaces of substrate 10 which can thereafter be scanned by a photodetector that provides a signal through suitable circuitry to adjust the microscope focus.

The width and depth of channels 12 may be suitably selected to accommodate the particular microstructures to be aligned. For example, for the purposes of aligning leukocytes, a suitable channel size is about three microns deep and from 7-10 microns wide. Such a channel will permit the leukocytes to substantially fill the channel preventing overlapping and the like.

Although the present invention has been described with respect to specific details of certain embodiments thereof, it is not intended that such details be limitations upon the scope of the present invention except insofar as is set forth in the following claims.

We claim:

1. The method of aligning microstructures for microscopic examination comprising the steps of
   providing a substrate having two opposite flat surfaces and at least one longitudinal channel formed in one of said surfaces, the depth of said channel being substantially constant throughout the length thereof,
   depositing a quantity of liquid containing said microstructures on said one surface of said substrate,
   pushing the microstructure containing liquid across said one surface of said substrate to permit the microstructures to drop into and be deposited in said channel in an aligned juxtaposed relationship, said channel being of sufficient size to accommodate a single layer of said microstructures in substantially single file in said aligned juxtaposed relationship, and removing the balance of said liquid.

2. The method of aligning leukocytes for microscopic examination comprising the steps of providing a substrate having two opposite flat surfaces and at least one longitudinal channel formed in one of said surfaces, the depth of said channel being substantially constant throughout the length thereof, depositing a quantity of blood, the erythrocytes of which have been lysed, on said one surface of said substrate, pushing said blood across said one surface of said substrate to permit the leukocytes to drop into and be deposited in said channel in an aligned juxtaposed relationship, said channel being of sufficient size to accommodate a single layer of said leukocytes in a substantially single file in said aligned juxtaposed relationship, and removing the balance of said blood.

* * * * *